United States Patent
Yadav et al.

(10) Patent No.: US 12,086,034 B2
(45) Date of Patent: Sep. 10, 2024

(54) META-DATA DRIVEN CLASSIFICATIONS OF BACKUP COPIES

(71) Applicant: Dell Products L.P., Round Rock, TX (US)

(72) Inventors: Sunil Yadav, Bangalore (IN); Shelesh Chopra, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 21 days.

(21) Appl. No.: 17/957,332

(22) Filed: Sep. 30, 2022

(65) Prior Publication Data

US 2024/0111633 A1     Apr. 4, 2024

(51) Int. Cl.
*G06F 11/14*     (2006.01)
*G06F 11/32*     (2006.01)

(52) U.S. Cl.
CPC ...... *G06F 11/1461* (2013.01); *G06F 11/1435* (2013.01); *G06F 11/327* (2013.01); *G06F 11/328* (2013.01)

(58) Field of Classification Search
CPC ............. G06F 11/1461; G06F 11/1435; G06F 11/327; G06F 11/328
USPC ........................................................ 714/6.31
See application file for complete search history.

(56) References Cited

U.S. PATENT DOCUMENTS

| | | | |
|---|---|---|---|
| 2014/0215279 A1* | 7/2014 | Houseman | G06F 11/2268 714/49 |
| 2017/0235950 A1* | 8/2017 | Gopalapura Venkatesh | G06F 9/4406 726/24 |
| 2023/0342345 A1* | 10/2023 | Xiao | G06F 11/1448 |

* cited by examiner

*Primary Examiner* — Yair Leibovich
(74) *Attorney, Agent, or Firm* — Chamberlain, Hrdlicka, White, Williams & Aughtry; Aly Z. Dossa

(57) ABSTRACT

In general, one or more embodiments of the invention relates to systems and methods for performing a backup and later determining a level or percentage of corruption of the resulting backup set. By having a cyber-security module analyze the backup data periodically, corruption of backup data both caused by cyber-attacks or by hardware failures may be detected and characterized. By knowing how corrupted a particular corrupted backup data set is, an informed decision may be made with regards to purging the backup data set and/or using the backup data set or portion thereof in any further restorations. By making these determinations, a quick identification of possible ransomware attacks may be made, and additional degradation of a user's data may be avoided.

18 Claims, 4 Drawing Sheets

META-DATA DRIVEN CLASSIFICATIONS OF BACKUP COPIES

BACKGROUND

As people increasingly rely on computing systems and devices to perform a plethora of tasks; the systems have become increasingly complex, and the opportunities for failure and/or loss of important data has also increased. To prevent loss of important data, performing a backup on the file-system of a computing system is necessary to prevent loss of data if a system failure occurs or cyber-attacks, such as ransomware, are directed towards the system. File-system backups leverage a file-based backup philosophy to protect the underlying data. This underlying mechanism is leveraged not just to protect the file-system on a host, but also to protect workflows in network attached storage.

SUMMARY

In general, certain embodiments described herein relate to a method for performing a backup. The method comprises of initiating, by a user, a backup of a production host and performing a backup of the production host to produce a backup data set. The backup data set is stored in backup storage and a copy is sent to a cyber-security module. The cyber-security module scans the backup data set to detect corruption and returns a measurement of a percentage of corruption of the backup data set to the production host or a backup agent. Once the measurement of the percentage of corruption is received by a backup agent or the production host, an indication of the level of corruption of the backup data set is displayed to the user of the production host and, the percentage of corruption is stored in the meta-data associated with the backup data set.

In general, certain embodiments described herein relate to a method for purging corrupted backup data sets. The method comprises of initiating, by a user, a purge of one or more corrupted backup data sets. Once the method is initiated, the meta-data associated with one or more corrupted backup data sets is retrieved. Using that meta-data, the level of the corruption is determined for each of the corrupted backup data sets. If the level of corruption is more than a predetermined threshold for a particular corrupted backup data set, that backup data set is deleted.

In general, certain embodiments described herein relate to a non-transitory computer readable medium comprising of computer readable program code, which when executed by a computer processor, enables the computer processor to perform a method for purging corrupted backup data sets. The method comprises of initiating, by a user, a purge of one or more corrupted backup data sets. Once the method is initiated, the meta-data associated with one or more corrupted backup data sets is retrieved. Using that meta-data, the level of the corruption is determined for each of the corrupted backup data sets and if the level of corruption is more than a predetermined threshold for a particular corrupted backup data set, that backup data set is deleted.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

DETAILED DESCRIPTION

Figure 1:
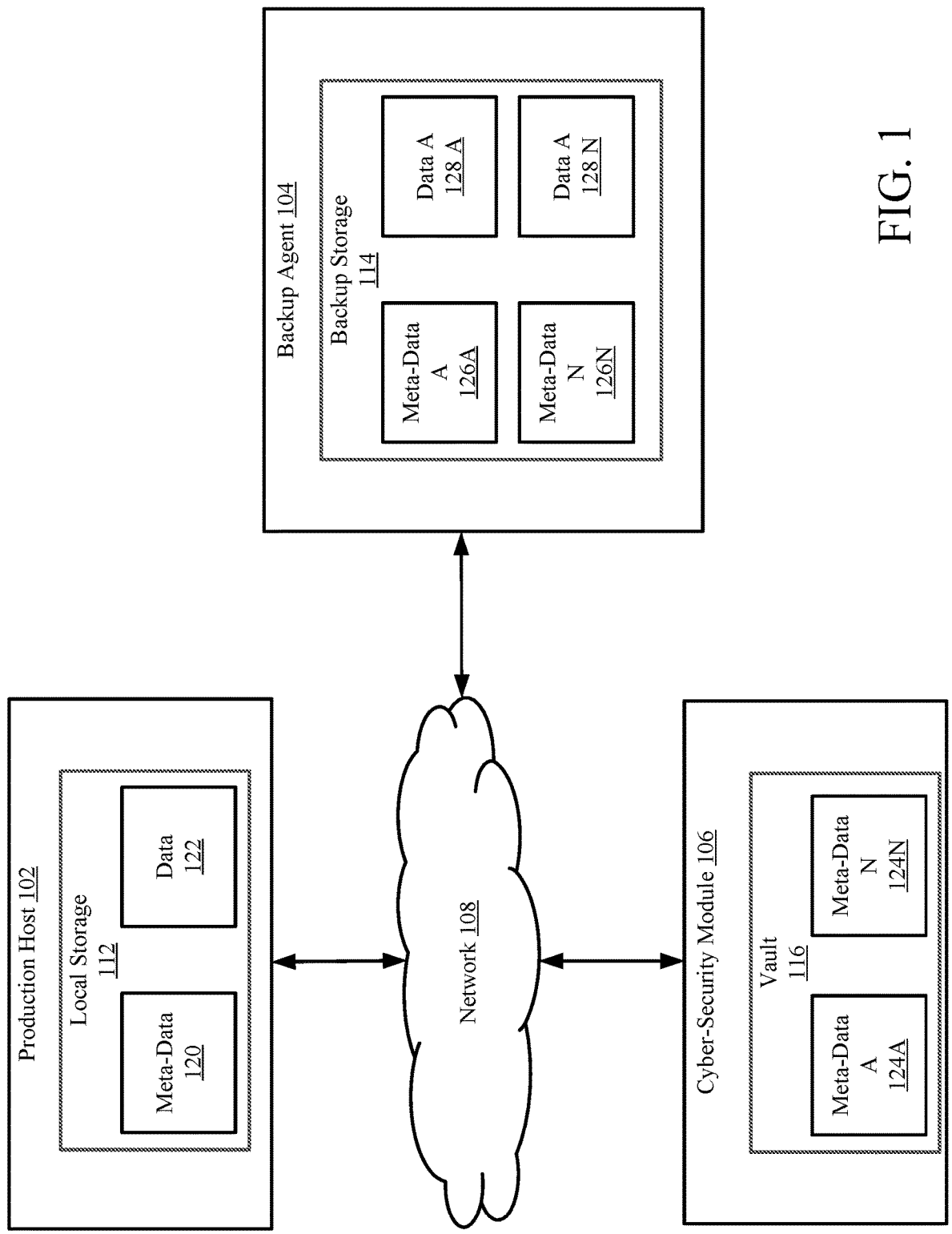
FIG. 1 shows a diagram of a system in accordance with one or more embodiments of the invention.

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase "operatively connected", or "operative connection", means that there exists between elements/components/devices a direct or indirect connection that allows the elements to interact with one another in some way. For example, the phrase 'operatively connected' may refer to any direct connection (e.g., wired directly between two devices or components) or an indirect connection (e.g., wired and/or wireless connections between any number of devices or components connecting the operatively connected devices). Thus, any path through which information may travel may be considered an operative connection.

When ransomware and other forms of cyber-attacks occur, data in either or both backup storage and/or in other forms of storage including working storage, is altered. This may comprise of altering meta-data, file headers, and/or full or partial file content corruption, such as encrypting the file. Generally, when any of these are corrupted by a ransomware attack, the backup data or working data is significantly altered, such as a notable change in file size (for example, a word document changing from 2 megabytes (MB) to 130 bytes).

While means for detecting and mitigating, ransomware and other similar cyber-attacks are available, they are costly and require considerable time to scan the data. Further, they are often only employed when a ransomware attack is suspected. By the time the attack is detected, it is often too late to prevent damage and/or stop potential spreading of the attack to other assets, such as backup files.

In general, one or more embodiments of the invention relates to systems and methods for performing a backup and later determining a level or percentage of corruption of the resulting backup set. By having a cyber-security module analyze the backup data periodically, corruption of backup data both caused by cyber-attacks or by hardware failures may be detected and characterized. By knowing how corrupted a particular corrupted backup data set is, an informed decision may be made with regards to purging the backup data set and/or using the backup data set or portion thereof in any further restorations. By making these determinations, a quick identification of possible ransomware attacks may be made, and additional degradation of a user's data may be avoided.

The following describes various embodiments of the invention.

FIG. 1 shows a diagram of a system in accordance with one or more embodiments of the invention. The system includes a production host (102), a backup agent (104), and cyber-security module (106). The system may include additional, fewer, and/or different components without departing from scope of the invention. Each component may be operably connected to any of the other component via any combination of wired and/or wireless connections including a network (108). Each component illustrated in FIG. 1 is discussed below.

In one or more embodiments of the invention, the system includes one or more production hosts (e.g., 102). While only one production host (e.g., 102) is shown, the production host (e.g., 102) may be part of a group that may include more production hosts without departing from the invention. For example, a group may comprise of at least three production hosts, at least sixteen production hosts, at least fifty production hosts, or at least a hundred production hosts without departing from the invention.

In one or more embodiments of the invention, the production host (102) performs workloads and provides services to clients and/or other entities not shown in the system illustrated in FIG. 1. The production host (102) may further include the functionality to perform computer implemented services for users (e.g., clients) of the system. The computer implemented services may include, for example, database services, electronic mail services, data processing services, etc. The computer implemented services may include other and/or additional types of services without departing from the invention.

In one or more embodiments of the invention, the production host (102) may provide application services by hosting applications. For example, the production hosts (102) may host any number of applications that provide application services to clients. Application services may include, but are not limited to, database services, electronic communication services, instant messaging services, file storage services, etc. Each of the production hosts may host any number of applications. Additionally, different production hosts may host the same number of applications or different numbers of applications. Different production hosts may also host similar or different applications.

In one or more embodiments of the invention, the production host (102) may host virtual machines (VMs) (not shown) that host the above-discussed applications. The production host (102) may host any number of VMs that, in turn, host any number of applications.

The production host (102) may also, or in addition to, the backup agent (e.g., 104), provide backup storage services and include backup storage on the local storage (e.g., 112). The backup storage services may include storing backups of data stored on the shared storages for restoration purposes. The backup storage services may include other and/or additional services without departing from the invention. The production hosts (102) may also, or in addition to the cyber-security module (e.g., 106), provide cyber-security data protection services and/or provide storage for the cyber-security vault (e.g., 116) on the local storage (e.g., 112).

Figure 4:
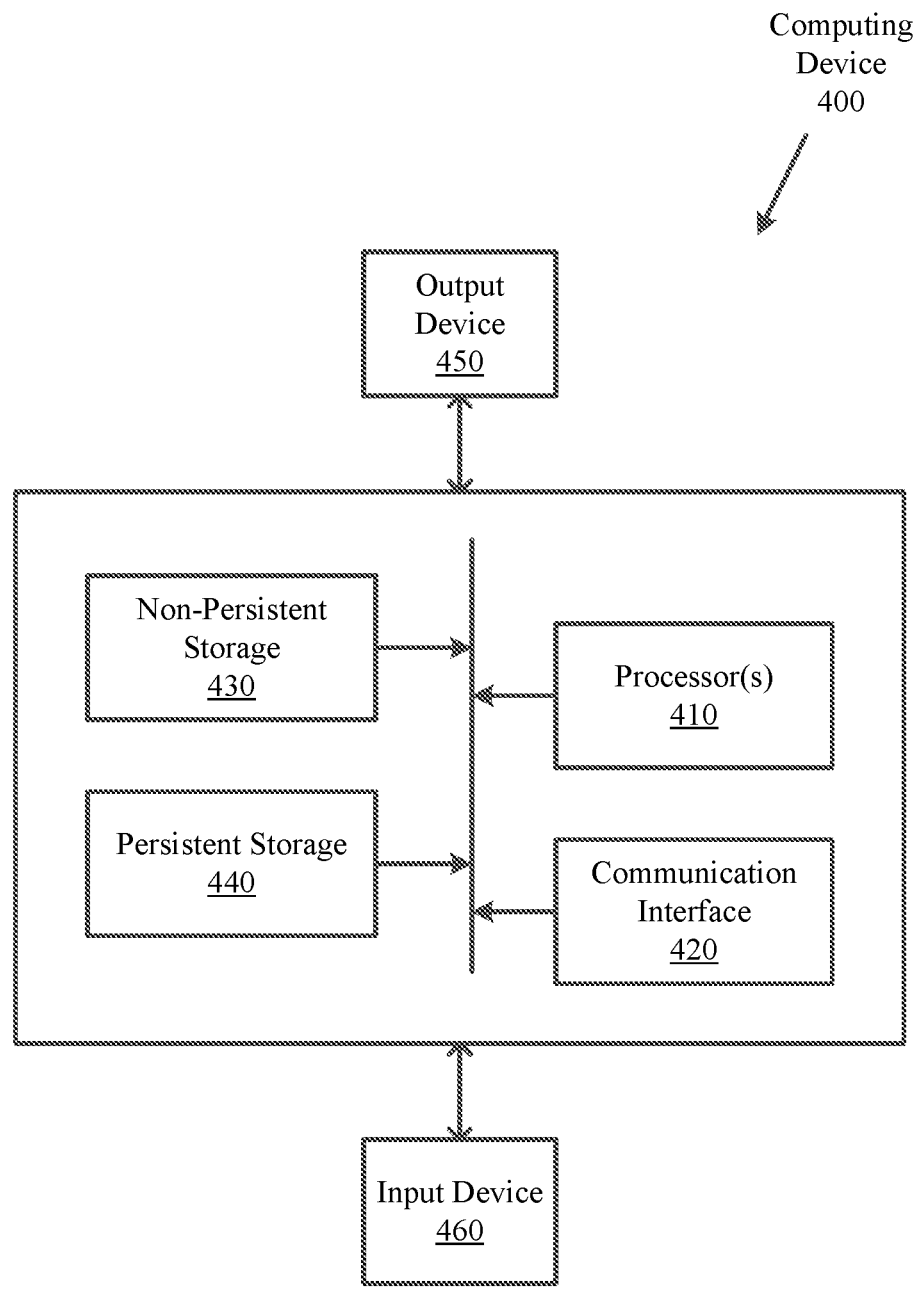
FIG. 4 shows a diagram of a computing device in accordance with one or more embodiments of the invention.

In one or more embodiments of the invention, the production host (102) is implemented as a computing device (see e.g., FIG. 4). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor (s) of the computing device, cause the computing device to perform the functionality of the production host (e.g., 102) described throughout this application.

In one or more embodiments of the invention, the production host (102) is implemented as a logical device. The logical device may utilize the computing resources of any number of computing devices, and thereby provide the functionality of the production host (102) described throughout this application.

The production host (102) as well as other components of the system and connected devices, may perform data storage services. The data storage services may include storing, modifying, obtaining, and/or deleting data stored on the local storage (e.g., 112) based on instructions and/or data obtained from the production host (102) and/or other components of the system. The data storage services may include other and/or additional services without departing from the invention. The local storage (e.g., 112) may include any number of storage volumes without departing from the invention.

The production host (102) includes local storage (112) for storing assets such as files and folders, which may be made available to other hosts or other requesting components such as the backup agent (e.g., 104) or client computers (not shown). The local storage (112) may include one or more processors, memory (e.g., random access memory), and persistent storage (e.g., disk drives, solid state drives, etc.). In one or more embodiments of the invention, the local storage (112) may also or alternatively comprise of off-site storage, including but not limited to, cloud base storage, and long-term storage such as tape drives (depending on the particular needs of the user and/or the system). The production host (102) may also utilize shared storage including at least one group shared volume (CSV) (not shown). Other types of shared storage may also or alternatively be included, such as active-passive storage and local storage (e.g., 112).

The local storage (e.g., 112) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data. The local storage device (e.g., 112) may utilize any quantity of hardware storage resources of any number of computing devices for storing data. For example, the local storage (e.g., 112) may utilize portions of any combination of hard disk drives, solid state disk drives, tape drives, and/or any other physical storage medium of any number of computing devices.

The local storage (112) includes file-system meta-data (120) and data (122). The file-system meta-data (e.g., 120) may be one or more data structures that include information regarding application data stored in the file-system (e.g., data 122). The information included in the file-system meta-data (e.g., 120) in one or more embodiments of the invention may be used for producing backups, as will be described in more detail with regards to the method shown in FIG. 2. The information included in the file-system meta-data (120), in one or more embodiments of the invention, may be additionally used by the backup agent (e.g., 104) to generate backups and historical meta-data, as well as the cyber-security module (e.g., 106) to perform cyber-security scans and ransomware detection. The file-system meta-data (120) may include other and/or additional information without departing from the invention.

The local storage (e.g., 112), may include one or more data structures (e.g., 122) that may be used to generate backups (e.g., 128A-128N) of assets of the file-system of the production host (e.g., 102). The file-system meta-data (e.g., 120) may include data (also referred to as "asset data") generated by users of the application(s) as discussed above. The asset data may be any type of data such as, but not limited to, database data and email data generated by users of the application(s), without departing from the invention. Each application may include any number of assets. Each asset may include any quantity of asset data, and furthermore, each asset may include any number of elements without departing from the invention. Users including, individuals, including administrators, developers, etc., that use the system, may use the data (e.g., 122) stored on the local storage (112) when obtaining computer implemented services from the production host (e.g., 102). Additionally, the data, (e.g., 122), stored on the storage device (112) of the production host (102) may be obtained by the backup agents (e.g., 104) to generate backups. The data (e.g., 122) of the local storage device (112) may be used by other and/or additional entities for other and/or additional purposes without departing from the invention.

In one or more embodiments of the invention, the system includes one or more backup agents (e.g., 104). The backup agent (104) may generate backups and store them in a related backup storage device (e.g., 114). The backup agent (104) generates a plurality of backup sets stored as data (e.g., 128A-128N), along with their meta-data (e.g., 126A-126N). The backup sets are generated based on backup policies and implemented by the backup agent (104) as will be described in more detail below with regards to the method shown in FIG. 2. The backup sets may also be purged based on backup policies and/or user/administrator instructions, as will be described in more detail below with regards to the method shown in FIG. 3.

The backup policies may specify a schedule in which applications or other assets, such as, but not limited to, individual files or folders stored in the data (122) associated with a production host (e.g., 102) are to be periodically backed up. The backup agent (104) in response to a backup policy, or in response to a backup request triggered by a client, such as a user or administrator, may be triggered to provide file-system meta-data (e.g., 120), generate a plurality of backup sets comprising backup data (e.g., 128A-128N), and generate backup meta-data (e.g., 126A-126N) associated with the plurality of backup sets. The backup agent (104) may also provide the backup meta-data and/or backup data to the cyber-security module (e.g., 106) for analysis including determining the level of corruption in the backup data (e.g., 128A-128N), as well as safe storage. The backup request may specify the applications(s) and/or assets including data (e.g., 122), such as files and folders associated with the applications to be backed up. The backup may be performed as a file-based backup or as a block-based backup.

In one or more embodiments of the invention, the backup agent (104) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (104) described throughout this application.

In one or more embodiments of the invention, the backup agent (104) is implemented as computer instructions, such as computer code, stored on a persistent storage that when executed by a processor of the production hosts (e.g., 102) causes the production hosts (e.g., 102) to provide the functionality of the backup agent (e.g., 104) described throughout this application.

In one or more embodiments of the invention, the backup agent (e.g., 104) may provide backup services to the production host (e.g., 102). The backup services may include generation and storage of backups in the backup storage device (114). The backups services may also include restoration of the production host (e.g., 102) using the backup data (e.g., 128A-128N) stored in the backup storage device (114).

The backup agent (104) may provide backup services to the production host (e.g., 102) by orchestrating: (i) generation of backups of the production host (e.g., 102), (ii) storage of backups (e.g., 128A-128N) of the production host (e.g., 102) on the backup storage device (114), (iii) consolidation of backup requests to reduce or prevent from generation of backups that are not useful for restoration purposes as well as purging those backups previously produced that are no longer useful, and (iv) restoration of the production host (e.g., 102) to previous states using backups (e.g., 128A-128N) stored on the backup storage device (e.g., 114). The system may include any number of backup agents (e.g., 104) without departing from the scope of the invention.

As discussed above, in one or more embodiments of the invention, the backup agents (e.g., 104) produce backups, including data (e.g., 128A-128N) and associated meta-data (e.g., 126A-126N) from a target file-system of the production host (e.g., 102). The backup agent (104) may include intelligent file-system crawlers (not shown) and/or other components as needed.

Additionally, to provide the backup services, the backup agent (e.g., 104) may include functionality to generate and issue instructions to any component of the system of FIG. 1. In one or more embodiments, the backup agent (e.g., 104) may also generate instructions in response to backup requests from other entities.

The backup meta-data (e.g., 126A-126N) and backup data (e.g., 128A-128N) associated with one or more backup sets are stored in the backup storage device (e.g., 114). The backup agent (104) may also include the functionality to provide backup meta-data (e.g., 126A-126N) and backup data (e.g., 128A-128N) to the production host (e.g., 102) and/or cyber-security module (e.g., 106) for restoration purposes, history monitoring purposes, cyber-security purposes, and/or other additional purposes without departing from the invention. The backup agent (e.g., 104) may include other and/or additional functionalities without departing from the invention. In another embodiment of the invention, the backup agent (e.g., 104) may be located on the production host (e.g., 102) or as part of the cyber-security module (e.g., 106) without departing from the invention.

The backup meta-data (e.g., 126A-126N) associated with the backup data sets (e.g., 128A-128N) may be one or more data structures, such as a database, that includes information related to the original location on the target production host (e.g., 102), information related to its current location in the backup's data (e.g., 128A-128N), its relationship with other related files/applications, and other pertinent information that may be configured by the user or administrator. The meta-data may also include indications of the percentage of corruption of the associated backup data (e.g., 128-128N). This meta-data is produced when the backup is performed, as will be described in more detail below with regards to the method described in FIG. 2. The meta-data is then used for determining if a backup data set (e.g., 128A-28N) should be purged, as described in more detail below with regards to the method described in FIG. 3.

Once produced, the meta-data (e.g., 126A-126N) may be used for quickly determining the contents of the backup, without having to perform a full restoration. As will be discussed in more detail below with regards to the method shown in FIG. 2, the meta-data (e.g., 126A-126N) may also be used by the cyber-security module (e.g., 106), or related component, for determining when changes occur to the backup data (e.g., 128A-128N) and/or the file-system data (e.g., 122) of the production host (e.g., 102) that may be indicative of a cyber-security attack, such as a ransomware attack.

At the time of a restoration, the backup meta-data (e.g., 126A-126N) may be used by the user or administrator to become better informed of the contents of a particular backup's data set (e.g., 128A-128N). The user or administrator may also use the backup meta-data (e.g., 126A-126N) to determine individual files to restore from the backup rather than the entire backup, such as but not limited to when part of the backup data set (e.g., 128A-128N) is corrupted.

In one or more embodiments of the invention, the backup agent (e.g., 104) is a physical device. The physical device may include circuitry. The physical device may be, for example, a field-programmable gate array, application specific integrated circuit, programmable processor, microcontroller, digital signal processor, or other hardware processors. The physical device may be adapted to provide the functionality of the backup agents (e.g., 104) described throughout this application.

In one or more embodiments of the invention, the backup agent (e.g., 104) is implemented as computer instructions, such as computer code, stored on a persistent storage that when executed, causes a processor to provide the functionality of the backup agent (e.g., 104) described throughout this application.

In one or more embodiments of the invention, the backup agent (e.g., 104) may generate such instructions in accordance with backup schedules that specify when backups are to be generated. In one or more embodiments, a backup schedule may provide specific points in time for a backup process to be performed.

In one or more embodiments of the invention, to satisfy the above-discussed backup schedules, the backup agent (e.g., 104) may monitor a backup window (e.g., four hours, eight hours, etc.) to perform a single backup, and/or multiple backups. Additionally, the backup agent (e.g., 104) may pause an ongoing backup if the backup exceeded the backup window. The backup agent (e.g., 104) may then resume the paused backup while performing a sequential backup in a parallel manner based on the backup schedule.

In one or more embodiments of the invention, the backup agent (104) may include a backup storage device (e.g., 114) for providing data storage services. For example, the backup storage device (114) may store backups of the production host (e.g., 102) in persistent storage system associated with the backup storage device (114). Alternatively, in one or more embodiments of the invention, the backup data sets (e.g., 128A-128N) and associated meta-data (e.g., 126A-126N) may be stored in storage associated with the production host (e.g., 102).

In one or more embodiments of the invention, the backup storage device (114) stores data related to the backup (e.g., 128A-128N). While only two backup data sets are shown (e.g., 128A and 128N), more data sets may be stored in the backup storage device (e.g., 114). The data stored in the backup storage device (114) may include backups of target data associated with applications of the production host (e.g., 102). The backup storage device (114) may store any quantity of backups without departing from the invention. The backup storage device (114) may store full backups, incremental backups, or any combination or type of backups. The backup storage device (114) may store other and/or additional data without departing from the invention.

The backup storage device (114) may also provide copies of the backups (e.g., 128A-128N) and the backup meta-data (e.g., 126A-126N) to the backup agent (e.g., 104), production host (e.g., 102) and/or the cyber-security module (106). The system may include any number of backup storage devices (e.g., 114) and backups comprising backup data (e.g., 128A-128N) and associated meta-data (e.g., 126A-126N) without departing from the scope of the invention.

The backup storage device (e.g., 114) may be implemented using physical storage devices and/or logical storage devices. The physical storage devices may include any combination of hard disk drives, solid state disk drives, tape drives, and/or any other physical storage mediums for the storage of data. The logical storage devices (e.g., virtualized storage) may utilize any quantity of hardware storage resources of any number of computing devices for storing data. For example, the backup storage device (114) may utilize portions of any combination of hard disk drives, solid state disk drives, tape drives, and/or any other physical storage medium of any number of computing devices.

In one or more embodiments of the invention, the backup storage device (114) may be implemented as computing devices (e.g., 400, FIG. 4). A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the backup storage device (e.g., 114) described throughout this application. Alternatively, in one or more embodiments of the invention, the backup storage device (e.g., 114) may also be implemented as a logical device, as discussed above.

In one or more embodiments of the invention, a cyber-security module (106) is provided. The cyber-security module includes a vault (116) which is a type of storage for safely securing data, including meta-data (e.g., 124A-124N) related to backups. The cyber-security module (106) may interact with the production host (e.g., 102) and the backup agent (e.g., 104) to provide cyber-security services to the production host (e.g., 102) and/or the backup agent (e.g., 104).

As is discussed in more detail below with regards to the method shown in FIG. 2, in one or more embodiments of the invention, the cyber-security module (106) may monitor backup meta-data (e.g., 126A-126N) and/or backup data sets (e.g., 128A-128N) for changes that may indicate corruption, such as corruption that occurs as a result of a cyber-attack.

The cyber-security module (106) includes hardware and/or applications that perform cyber-security functions. These functions include but are not limited to detecting ransomware, trojans, viruses, worms, botnets, and/or other types of malware. The cyber-security module (106) may include advance analytics and other applications for detecting malware. The cyber-security module may be maintained by an administrator, manufacture, third-party, or other user of the system. The cyber-security module (106) and/or its vault (116) may be air-gapped (not connected to external and/or internal networks), except when receiving data for scanning from the production host (e.g., 102) and/or backup agent (e.g., 104).

In one or more embodiments of the invention, the cyber-security module (106) stores copies of the meta-data (124A-124N) in a vault (116). This allows a copy of the original meta-data to be maintained and not affected by any malicious outside influences. By comparing the backup meta-data (e.g., 124A-124N) stored in the cyber-security vault (e.g., 116) to backup meta-data (e.g., 126A-126N) not stored in the vault, the cyber-security module may detect when changes have occurred to the backup that may be indicative of the data becoming corrupted or of a cyber-attack. The meta-data (e.g., 124A-124N) stored in the vault (116) may also be leveraged to determine which backups and/or parts of the backups are useful for restoring the production host's data (e.g., 122) after a cyber-attack, or as a result of corruption of at least some of the backup data (e.g., 128A-128N).

The vault (e.g., 116) may be implemented using physical storage devices and/or logical storage devices. The physical storage devices may include any combination of hard disk drives, solid state disk drives, tape drives, and/or any other physical storage mediums for the storage of data. The logical storage devices (e.g., virtualized storage) may utilize any quantity of hardware storage resources of any number of computing devices for storing data. For example, the vault (116) may utilize portions of any combination of hard disk drives, solid state disk drives, tape drives, and/or any other physical storage medium of any number of computing devices.

In one or more embodiments of the invention, the cyber-security module (106) may include machine learning or AI for detecting changes in data that are indicative of a cyber-attack. By monitoring the meta-data (e.g., 126A-126N) and/or backup data (e.g., 128A-128N) produced during one or more backups for changes in the data, the cyber-security module (106) may detect when changes occur in the data that may be indicative of a cyber-attack such as a ransomware attack. Such indications may be, but not limited to, a detection that a hash value of the data unexpectedly changes or changes more than a preset threshold. Other unexpected changes that may be indicative of a cyber-attack are changes in file type, encryption, and file size. The cyber-security module (106) also includes the ability to be updated. This allows the cyber-security module (106) to be able to detect future threats that are not currently anticipated.

In one or more embodiments of the invention, the cyber-security module (106) may include functionality to use services provided by the production host (e.g., 102). For example, the cyber-security module may use graphical user interfaces (GUI) provided by the production host (102) to alert a user that a cyber-attack may be occurring, or to receive feedback from a user or administrator of the system.

In one or more embodiments of the invention, the cyber-security module (e.g., 106) may be implemented as computing devices (e.g., 400, FIG. 4). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the cyber-security module (e.g., 106) described throughout this application.

Alternatively, in one or more embodiments of the invention, the cyber-security module (e.g., 106) may also be implemented as logical devices, as discussed above.

In one or more embodiments of the invention, the production host (e.g., 102), the backup agent (e.g., 104), the cyber-security module (e.g., 106) as well as other components of the system, such as clients (not shown), communicate through a network (108). The network (108) may take any form, including any combination of wireless and/or wired networks. The network (108) may be a local network (LAN) or a wide area network (WLAN) including the Internet, or a private enterprise network that connects more than one location. The network (108) may be any combination of the above networks, other known network, or any combination of network types.

In one or more embodiments of the invention, the network (108) allows the system to communicate with other systems and external computing devices such as (but not limited to) a client. The various components of the system may also communicate with each other through the network. The network may be a high-speed internal network and/or include part of an external network (e.g., 108). The production host (e.g., 102), backup agent (e.g., 104) and cyber-security module (e.g., 106) communicate with each other over the internal network and in one or more embodiments of the invention provide fallback functionality.

A network (e.g., 108) may refer to an entire network or any portion thereof (e.g., a logical portion of the devices within a topology of devices). A network may include a data center network, a wide area network (WLAN), a local area network (LAN), a wireless network, a cellular phone network, and/or any other suitable network that facilitates the exchange of information from one part of the network to another. A network may be located at a single physical location or be distributed at any number of physical sites. In one or more embodiments, a network may be coupled with or overlap with, at least in part, the Internet.

In one or more embodiments, although shown separately in FIG. 1, the network (108) may include any number of devices within any components (e.g., 102, 104, and 106) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

Figure 2:
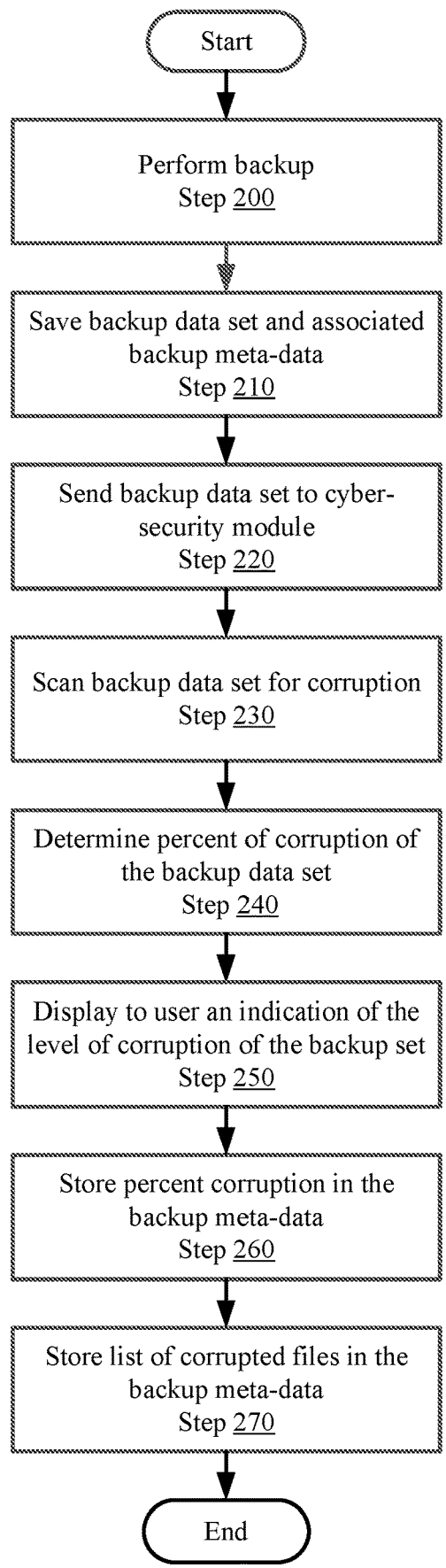
FIG. 2 shows a flowchart of a method of generating a backup in accordance with one or more embodiments of the invention.

FIG. 2 shows a flowchart of a method for generating a backup in accordance with one or more embodiments of the invention. The method may be performed, for example, by a backup agent (e.g., 104, FIG. 1) and/or the cyber-security module (e.g., 106, FIG. 1). Other components of the system illustrated in FIG. 1 may perform all, or a portion of the method of FIG. 2 without departing from the invention. While FIG. 2 is illustrated as a series of steps, any of the steps may be omitted, performed in a different order, additional steps may be included, and/or any or all the steps may be performed in a parallel and/or partially overlapping manner without departing from the invention.

While the method of FIG. 2 only shows a single backup being performed, the method of FIG. 2 is not limited to producing only a single backup data set. Steps 200-270 may be repeated as many times as instructed by a user, administrator, and/or backup policy to produce a plurality of backup data sets that may or may not be determined to be corrupted by a cyber-security module.

In step 200, the system receives a backup request and performs a backup of data on the production host (e.g., 102, FIG. 1). In one or more embodiments of the invention, the backup is started based on a backup generation event that is identified by the backup agent (e.g., 104, FIG. 1) at a point in time specified by a backup policy associated with the generation of a backup of the production host (e.g., 102, FIG. 1). In one or more embodiments of the invention, the backup may also, or alternatively, be started after the system obtains a message from a client requesting the generation of a backup of the production host.

In one embodiment, the backup agent (e.g., 104, FIG. 1) may use a backup policy associated with the production host (e.g., 102, FIG. 1) that specifies points in time to generate at least one backup of the production host's file-system. The backup agent may monitor the backup policy and identify when a point in time specified by the backup policy occurs. The backup policy may include an identifier associated with the production host corresponding with the backup policy. The identification of the point in time specified by the backup policy may result in the identification of the backup generation event by the backup agent.

Alternatively, in one or more embodiments of the invention, a user, administrator, or other client of the system may send a message to the backup agent. The message may include a request to generate a backup of the production host. The message may include an identifier associated with the production host. The backup agent may identify obtaining the aforementioned message as the backup generation event. The backup generation event initiating a backup of a target may be identified by other and/or additional methods without departing from the invention.

The message or backup policy may additionally include instructions or policies for performing the backup, as well as performing cyber-security checks utilizing the cyber-security module (e.g., 106, FIG. 1). The policy or instructions may include such things as when and how often a subsequent backup should be performed. The user, administrator, or application may provide the policy and/or instructions when configuring the initial backup, or at any time when the configuration is needed as a result of a change to either the production host, cyber-security risks, and/or user/administrator preferences.

In one or more embodiments of the invention, an intelligent file-system crawler or other component of the backup agent (e.g., 104, FIG. 1) collects the file-system meta-data (e.g., 120, FIG. 1), from the file-system of the production host (e.g., 102, FIG. 1). Meta-data for each file and folder is collected and stored in a backup meta-data file (e.g., 126A, FIG. 1). This file may take the form of a database or other similar type of file that may allow for easy analysis of the file-system meta-data. The file may take other forms without deviating from the scope of the disclosed invention.

Once the initial backup is performed in step 200, the resulting backup data set (e.g., 128A-128N, FIG. 1) and its related meta-data (e.g., 126A-126N, FIG. 1) are saved in the backup storage (e.g., 114, FIG. 1) in step 210. The related meta-data may specify how critical the backup is to a user, where such information may be provided by the user.

After step 210 is completed, the method proceeds to step 220 where the backup data set (e.g., 128A-128N, FIG. 1) is sent to the cyber-security module and scanned in step 230 for corruption. The cyber-security module determines which, if any, files, and folders in the backup data set are corrupted. Alternatively, where the backup is a block-based backup, the cyber-security module may determine what, if any, blocks are corrupted. Corruption may be a result of a cyber-attack such as a ransomware attack (a result of hardware failures, such as a hard-drive failure), or from other sources. The cyber-security module may use analytics such as machine learning to recognize when the backup data set is corrupted, as well as determine which files, folder, and/or blocks are corrupted.

Steps 220 and 230 may be performed immediately after step 210 is completed, may be performed sometime later, or a combination thereof. Further steps 220 and 230 as well as steps 240-260 (which are described below) may be repeated at a preset interval or when a cyber-attack is suspected. The preset interval may be set when the backup is initially configured, or as a result of a data protection policy. In a non-limiting example, the data set may be scanned immediately after step 210, and then every thirty days as part of a data protection policy. Other intervals such as, but not limited to, every day, every week, and every year may be used without departing from the invention.

Once the backup data set is scanned in step 230, the method proceeds to step 240, where a percentage of corruption is calculated. In the case where there is no corruption, this percentage would be 0%. However, if half the backup data set is corrupted, the percentage would be 50%. The percentage of corruption of the backup data set may be any amount between 0% and 100%, as determined by the cyber-security module. The percentage may be based on the number of corrupted blocks a backup has, or the percentage may be based on the number of corrupted files and folders stored in the corrupted backup data set.

Once the percentage of corruption is determined in step 240, the method proceeds to step 250 where an indication of the level of corruption of the backup set is displayed to the user. The indication may be displayed on a client computer (not shown) associated with the user and/or may be displayed on a display associated with one or more other users or administrators of the production host (e.g., 102, FIG. 1). The indication is based on percentage of corruption and may be a displayed percentage; said another way the indication may correspond to a recoverability ranking of the backup. Other meta-data, such as how critical the backup is, may also be displayed to the user.

In one or more embodiments of the invention, the indication may be a display of a level of corruption. The levels may be categorized into different categories depending on the range of percentages of corruption or based on a type of corruption. The categories may be assigned based on the percentage of corruption being less than or equal to a predetermined threshold for each type. A non-limiting example is that each backup data set is categorized as being one of a platinum, gold, silver, or red categories. A platinum indication is given when the backup data set has 0% corruption, a gold indication when the backup data set has 1%-25% corruption, silver indication of 26%-50% corruption, and a red indication is given when the corruption is more the 50%. Other ranges of corruption, categories of corruption, as well as means for indicating the level of corruption may be used without departing from the invention.

The percentage is stored in the associated backup meta-data in step 260 along with a list of the corrupted files or blocks in step 270. The list may be determined by the cyber-security module when it scans the backup data for corruption in step 230. Alternatively, in step 270, a list of the files or blocks that are not corrupted are saved, allowing any process using the backup data set to know which files/blocks are safe to use and which should be skipped over. The specifics of using the backup data set and the stored percentage and list of corrupted files, blocks, and/or folders is discussed below with regards to the method described in FIG. 3.

The method may end following 270. Each time a new backup is needed as a result of instructions from a user, administrator, and/or backup policy, the method of steps 200-270 may be repeated to produce a plurality of backup data sets, each having a percentage of corruption determined by the cyber-security module. The plurality of backup sets may be produced on a set schedule, or as significant changes are noted in the meta-data (e.g., 120, FIG. 1) that necessitate an updated backup. The additional backup sets may be additional full backups, incremental backups, or combination thereof as configured by a user or administrator. The method of steps 200-270 may be repeated on a set schedule as configured by a user or administrator. For example, the backups may be performed once a day, once a week, or at any-other interval as selected by the user, administrator, and/or a protection policy.

Figure 3:
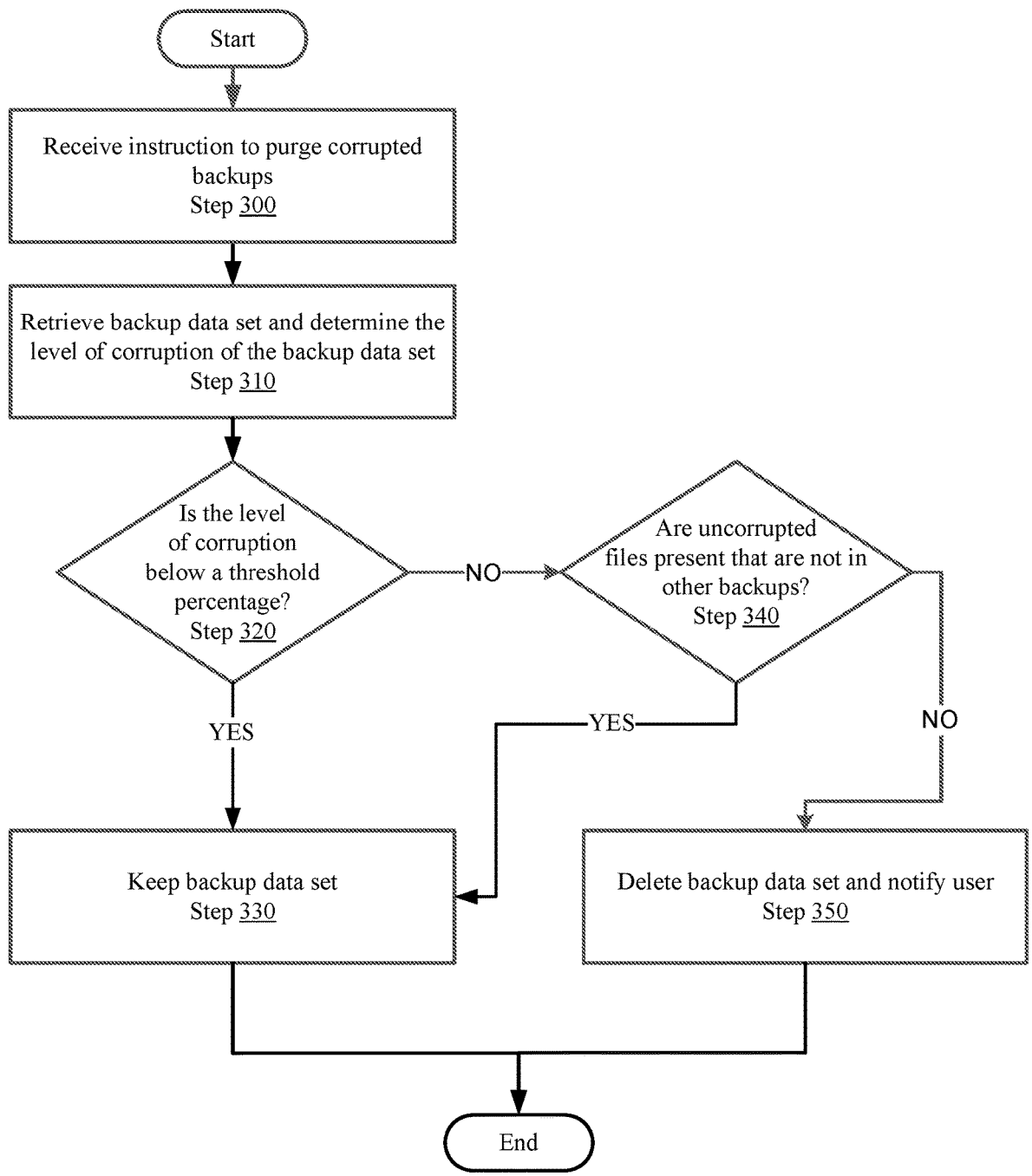
FIG. 3 shows a flowchart of a method of purging corrupted backup sets in accordance with one or more embodiments of the invention.

FIG. 3 shows a flowchart of a method for purging corrupted backups in accordance with one or more embodiments of the invention. The method may be performed, for example, by a backup agent (e.g., 104, FIG. 1) and/or the cyber-security module (e.g., 106, FIG. 1). Other components of the system illustrated in FIG. 1 may perform all, or a portion of the method of FIG. 3 without departing from the invention. While FIG. 3 is illustrated as a series of steps, any of the steps may be omitted or performed in a different order. Further, additional steps may be included, and/or any or all the steps may be performed in a parallel and/or partially overlapping manner without departing from the invention.

In step 300, the system receives instructions to purge (or otherwise delete) corrupted backups. The backups may be those generated by the method described above and that is illustrated in FIG. 2. Alternatively, the backups may be generated by a different method then those described above without departing from the invention. The backups in one or more embodiments of the invention may comprise of the data sets (e.g., 128A-128N, FIG. 1) and their related meta-data (e.g., 126A-126N, FIG. 1) stored in backup storage. Alternatively, the corrupted backup data sets may be stored anywhere including on a production host (e.g., 102, FIG. 1), cyber-security vault (e.g., 116, FIG. 1) or any other network connected location including cloud-based storage.

In one or more embodiments of the invention, the instructions to purge corrupted backups come from a user or administrator. The instructions may originate from a data-protection policy or storage device's policies. The instructions may also be originated when a cyber-attack is detected, or is suspected as part of mitigation policies, or actions taken by a user or administrator.

Once the instructions are received in step 300, the method proceeds to step 310, where the corruption of the backup data set is determined. In one or more embodiments of the invention, the level of corruption of the backup data set is determined by a cyber-security module (e.g., 106, FIG. 1) as described in more detail above with regards to the method shown in FIG. 2. The level of corruption of the backup data set may be determined by other means without departing from the invention. In one or more embodiments of the invention, the level of corruption of the backup data set is measured in a percentage of corruption, which is the percentage of files, folders, and blocks that are corrupted out of the total files, folders, and blocks.

Once the method determines the level of corruption of the backup data set in step 310, the method proceeds to step 320, where the level of corruption is compared to a threshold. The threshold may be established by the instruction to purge in step 300 or may be established based on a protection policy or user and/or administrator's instructions. In one non-limiting example the threshold may be specified as a specific percentage or percentage range, for example the threshold may be any percentage under 50% or a percentage under 10%.

In one or more other embodiments of the invention, the threshold may be based on a category of corruption; wherein a user, administrator, or a protection policy specifies that if those backup data sets of a particular category may be kept while those of other categories may be purged. The levels may be separated into different categories depending on the range of percentages of corruption or based on type of corruption. The categories may be assigned based on the percentage of corruption being less than or equal to a predetermined threshold for each type. A non-limiting example is that each backup data set is categorized as being one of a platinum, gold, silver, or red categories, wherein a platinum indication is given when the backup data set has 0% corruption, a gold indication is given when the backup data set has 1-25% corruption, silver indication of 26%-50% corruption, and a red indication is given when the corruption is more the 50%. Other ranges of corruption, categories of corruption, as well as means for indicating the level of corruption may be used without departing from the invention. The aforementioned categorizations may be referred to as recoverability rankings.

If in step 320 it is determined that the backup-data set has a level of corruption that is below the threshold, the method proceeds to step 330, where the backup is kept, and the method ends. If, however, in step 320, the level of corruption is greater than the threshold or is of a category that is indicated for purging, the method proceeds to step 340.

In step 340, the meta-data for the backup data set is examined for indications of which files and/or folders are not corrupted. If the meta-data indicates that there are files that are not found in other backup data sets, the method proceeds to step 330, where the backup data set is kept, and any further restoration may skip those files that are corrupted, while being able to restore at least those files that are not in other backups. Alternatively, if no files or folders are present in the backup data set that are not included in other backup data sets, the method proceeds to step 350 where the backup data set is deleted.

In one or more optional embodiments of the invention, the user or administrator is notified in step 350 that the backup data set is to be deleted. The user, administrator, or automatic process may then choose instead to have the system not delete the backup data. The user, administrator or automatic process might decide to not delete the backup data set in such instances as, but not limited to, where the backup-data set is the least corrupted backup-data set for one or more assets.

The method may end following either step 330 or 350. In one or more embodiments of the invention, steps 310-350 may be repeated for a plurality of backup data sets and the method of FIG. 3 should not be considered to only apply to a single backup data set. The method of steps 300-350 may be repeated on a set schedule as configured by a user or administrator. For example, the backup data set may be purged once a week, once a year, once every five years, or at any-other interval as selected by the user, administrator, and/or a protection policy.

Additionally, as discussed above, embodiments of the invention may be implemented using computing devices. FIG. 4 shows a diagram of a computing device in accordance with one or more embodiments of the invention. The computing device (400) may include one or more computer processors (410), non-persistent storage (430) (e.g., volatile memory, such as random access memory (RAM), cache memory), persistent storage (440) (e.g., a hard disk, an optical drive such as a compact disk (CD) drive or digital versatile disk (DVD) drive, a flash memory, etc.), a communication interface (420) (e.g., Bluetooth interface, infrared interface, network interface, optical interface, etc.), input devices (460), output devices (450), and numerous other elements (not shown) and functionalities. Each of these components is described below.

In one embodiment of the invention, the computer processor(s) (410) may be an integrated circuit for processing instructions. For example, the computer processor(s) may be one or more cores or micro-cores of a processor. The computing device (400) may also include one or more input devices (460), such as a touchscreen, keyboard, mouse, microphone, touchpad, electronic pen, or any other type of input device. Further, the communication interface (420) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (450), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (410), non-persistent storage (430), and persistent storage (440). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to generating backups of assets. More specifically, in one or more embodiments of the invention one or more backup data sets are produced, and at a later time a level or percentage of corruption of the resulting backup set may be determined. By having a cyber-security module analyze the backup data periodically, corruption of backup data both caused by cyber-attacks or by hardware failures may be detected and characterized. By knowing how corrupted a particular backup data set is, an informed decision may be made with regards to purging the backup data set, and/or using the backup data set or portion thereof in any further restorations. By making these determinations, a quick identification of possible ransomware attacks may be made, and additional degradation of a user's data may be avoided.

The problems discussed above should be understood as being examples of problems solved by embodiments of the invention disclosed herein, and the invention should not be limited to solving the same/similar problems. The disclosed invention is applicable to address a range of problems beyond those discussed herein.

While the invention has been described with respect to a limited number of embodiments, those skilled in the art, having the benefit of this disclosure, will appreciate that other embodiments may be devised which do not depart from the scope of the technology as disclosed herein. Accordingly, the scope of the invention should be limited only by the attached claims.

What is claimed is:

1. A method for performing a backup, the method comprising:
    initiating, a backup of a production host;
    performing the backup of the production host to produce a backup data set;
    storing the backup data set;
    sending the backup data set to a cyber-security module;
    receiving from the cyber-security module a measurement of a percentage of corruption of the backup data set;

displaying to a user of the production host an indication of a level of corruption of the backup data set, wherein the indication is derived from the measurement of the percentage of corruption of the backup data set; and storing the percentage of corruption in meta-data associated with the backup data set.

2. The method of claim 1, wherein performing the backup of the production host to produce the backup data set is repeated periodically to produce a plurality of backup data sets.

3. The method of claim 2, wherein each of a plurality of backup data sets is sent to the cyber-security module for a measurement of the percentage of corruption of each of the plurality of backup data sets and the percentage of corruption is stored in meta-data associated with each of the plurality of backup data sets.

4. The method of claim 3, further comprising: deleting, after storing the percentage of corruption, one or more of the plurality of backup data sets of the production host that has a level of corruption that is greater than a predetermined threshold.

5. The method of claim 1, wherein sending the backup data set to the cyber-security module is repeated periodically.

6. The method of claim 1, wherein the indication of the level of corruption comprises of a category of corruption that is assigned based on the percentage of corruption being less than or equal to a predetermined threshold for each category.

7. The method of claim 1, wherein the meta-data associated with the backup data set specifies a recoverability ranking.

8. The method of claim 1, wherein the meta-data associated with the backup data set may specify how critical the backup is to a user.

9. A method for purging corrupted backup data sets, the method comprising:

initiating a purge of one or more corrupted backup data sets;

retrieving meta-data associated with one of the one or more corrupted backup data sets;

determining from the meta-data associated with the one of the one or more corrupted backup data sets a level of corruption of the one of the one or more corrupted backup data sets; and deleting the one of the one or more corrupted backup data sets, when the level of corruption of the one of the one or more corrupted backup data sets is greater than a predetermined threshold, and wherein when the level of corruption is less than or equal to the predetermined threshold, the one of the one or more corrupted backup data sets is not deleted.

10. The method of claim 9, wherein when the meta-data associated with the one of the one or more corrupted backup data sets indicates that the one of the one or more of the corrupted backup data sets has uncorrupted files not found in another of the one or more of the corrupted backup data sets, the one of the one or more corrupted backup data sets is not deleted.

11. The method of claim 9, wherein the level of corruption of each of the one or more corrupted backup data sets is determined by a cyber-security module.

12. The method of claim 11, wherein the level of corruption of the one or more corrupted backup data sets is updated periodically.

13. The method of claim 9, wherein prior to deleting the one of the one or more corrupted backup data sets, a user is notified that the one of the one or more corrupted backup data sets is to be deleted.

14. A non-transitory computer readable medium comprising of computer readable program code, which when executed by a computer processor enables the computer processor to perform a method for performing a backup, the method comprising:

initiating a purge of one or more corrupted backup data sets;

retrieving meta-data associated with one of the one or more corrupted backup data sets;

determining from the meta-data associated with the one of the one or more corrupted backup data sets a level of corruption of the one of the one or more corrupted backup data sets; and deleting the one of the one or more corrupted backup data sets, when the level of corruption of the one of the one or more corrupted backup data sets is greater than a predetermined threshold, and wherein when the level of corruption is less than or equal to the predetermined threshold, the one of the one or more corrupted backup data sets is not deleted.

15. The non-transitory computer readable medium of claim 14, wherein when the meta-data associated with the one of the one or more corrupted backup data sets indicates that the one of the one or more of the corrupted backup data sets has uncorrupted files not found in another of the one or more of the corrupted backup data sets, the one of the one or more corrupted backup data sets is not deleted.

16. The non-transitory computer readable medium of claim 14, wherein the level of corruption of each of the one or more corrupted backup data sets is determined by a cyber-security module.

17. The non-transitory computer readable medium of claim 14, wherein the level of corruption of the one or more corrupted backup data sets is updated periodically.

18. The non-transitory computer readable medium of claim 14, wherein prior to deleting the one of the one or more corrupted backup data sets, a user is notified that the one of the one or more corrupted backup data sets is to be deleted.

* * * * *